Aug. 25, 1959 M. J. KELLY 2,901,580

ELECTRICAL CONTACT DEVICE

Filed Dec. 28, 1954 3 Sheets-Sheet 1

INVENTOR.
M. J. KELLY

BY James A. Kurtz

AGENT

| OPERATE | CONNECTED |
|---|---|
| 1-2 | A-W |
| 1-4 | B-W |
| 1-6 | C-W |
| 1-8 | D-W |
| 3-2 | A-X |
| 3-4 | B-X |
| 3-6 | C-X |
| 3-8 | D-X |

INVENTOR.
M.J. KELLY
BY James A. Ruth
AGENT

ELECTRICAL CONTACT DEVICE

Filed Dec. 28, 1954 3 Sheets-Sheet 3

INVENTOR.
M.J. KELLY

BY James A. Rich

AGENT

United States Patent Office 2,901,580
Patented Aug. 25, 1959

2,901,580
ELECTRICAL CONTACT DEVICE

Martin J. Kelly, Endicott, N.Y., assignor to International Business Machines Corporation, New York, N.Y., a corporation of New York Application December 28, 1954, Serial No. 477,980
4 Claims. (Cl. 200—152)

This invention relates to electrical circuit making devices generally, and is particularly directed to contacting devices employing metals engaging with a semi-liquid substance.

More concisely stated, a general object of the present invention resides in the provision of means adapted to use mercuric amalgams as a contact material in electrical circuit making devices.

Liquid mercury has long been used in prior art devices as an electrical contact material. Many investigations have shown that when mercury in its pure liquid state is sealed along with contact wires in an enclosed vessel containing an inert atmosphere, a highly efficient circuit maker is produced.

A property of mercury is its power to form liquid metallic solutions, or amalgams. It is this peculiar property of mercury which is of particular interest for application as an electrical circuit contact for use in air.

Accordingly, a principal object of the invention resides in a novel means using mercuric amalgams as an electrical circuit contact.

An object of the invention resides in the provision of a novel electrical relay.

Another object of the invention resides in the provision of means enabling a relay to operate its contacts with a complete absence of bounce.

It may be pointed out here that a relay contact, formulated according to the traditional methods, generally results in a relay that cannot be safely used in electronic circuits without the use of auxiliary electrical elements for filtering out spurious impulses created by contact bounce.

Still another object of the invention is to provide a wide range of amalgams that may be used as contact materials and are eminently adapted for use in electronic circuitry.

This application is related to an application filed December 28, 1954, by Martin J. Kelly and Joseph E. Wallace, Serial No. 478,091, entitled "Amalgam Contact Material," now Patent 2,850,382.

Yet another object of the invention resides in the provision of means for establishing a plurality of contact types.

Still another object of the invention resides in the provision of an amalgam contact device which continuously forces impurities and contamination away from the contact surface.

A feature of the invention resides in the provision of means for creating virtually resistanceless contact engagement surfaces.

Another feature of the invention resides in the provision of amalgams which will mercury wet, or adhere, to non-amalgamating metals, glass or plastics.

Still another feature of the invention resides in the provision of amalgams which inhibit oxidation in an ambient atmosphere at operating temperatures.

Other objects of the invention will be pointed out in the following description and claims and illustrated in accompanying drawings, which disclose, by way of examples, the principle of the invention and the best mode, which has been contempleted, of applying that principle.

Figure 1:
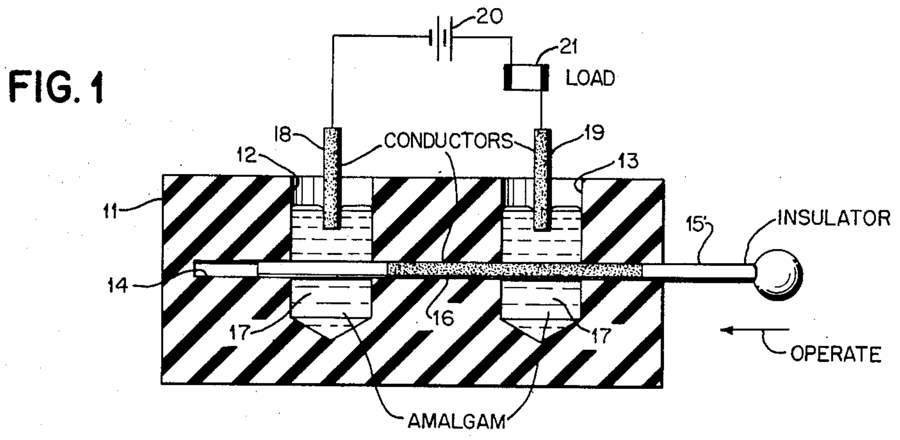
Fig. 1 shows the construction of a mercuric amalgam electrical circuit making element.

Now, referring to Fig. 1, the principle of operation of the novel contact maker is explained.

In a block 11 of a suitable insulating material there may be drilled a pair of holes 12 and 13. A third hole 14, smaller in diameter is drilled from another side of block 11 so as to intersect with holes 12 and 13.

Introduced into hole 14 is an insulating member, or plunger, 15. There should be a snug, yet freely sliding, fit between member 15 and hole 14. Plunger 15 is provided with an annular collar 16 which may be formed from a conductive material which preferably should be capable of being wetted by the amalgam but, on the other hand, should not amalgamate therewith. A mercuric amalgam 17 is now introduced into holes 12 and 13, and a pair of conductors 18 and 19, having the same properties as conductor 16, are submerged in the amalgam.

An external circuit may be connected to conductors 18 and 19. For purposes of illustration, a circuit is shown by battery 20 and a load 21.

With the insulating member 15 in the position shown, an electrical circuit is partially completed from battery 20, through the load 21, terminal 19, amalgam 17 to the annular member 16. All that is necessary to complete the circuit and energize the load is to push member 15 in the direction shown so as to move member 16 into contacting engagement with the amalgam 17 in hole 12 whereupon the electric circuit will be established through the amalgam and terminal 18 back to the battery. It will be understood that holes 12 and 13, containing the fluid metallic alloy or amalgam, are not sealed, but instead remain openly vented to the ambient atmosphere.

THE AMALGAMS—THE AMALGAM CONTACT

*The mercury alloys*

The contact maker which is hereinabove described is desired to operate in air so as to obviate the inconvenient necessity of enclosing the operating parts within a vacuum or within an inert atmosphere. Metallic mercury is incapable of being used in such a contact maker design as it would contaminate and would leak out of the port 14 thereby rendering the device useless.

It is desirable that the amalgam or alloy be physically stable and such stability is found to be enhanced by the use of noble metals—among these, gold, silver and palladium are especially suitable.

Mercury-gold amalgams have been compounded and it has been noted that for electrical contact purposes the following percentages of gold (by weight) may be amalgamated with mercury to form suitable contact materials.

The percentages of gold as an 80 mesh powder are: 5.5%, 9.3%, 11.5%, 13.3% and 17.3%.

Mercury-palladium amalgams have been compounded and it has been noted that for electrical contact purposes the following percentages of palladium (by weight) may be amalgamated with mercury to form suitable contact materials.

The percentages of palladium as an 80 mesh powder are: 2.55%, 3.70%, 4.56% and 6.85%.

Mercury-silver amalgams have been compounded and it has been noted that for electrical contact purposes the following percentages of silver (by weight) may be amalgamated with mercury to form suitable contact materials.

The percentages of silver as precipitated flowers are: 5.5%, 7.20%, 9.70% and 14.33%. The percentage of silver as a 40 mesh powder is: 7.20%.

The percentages with silver-palladium precipitated silver flowers and 80 mesh palladium are as follows: 7.20% silver and .1% palladium and 14.33% silver and .1% palladium.

While all of the above amalgams are suitable for the contemplated purpose it has been observed that amalgams incorporating palladium are the most stable and that there appears to be no noticeable change in characteristics when allowed to stand over a long period of time. These desirable qualities are still observed when the percentages of palladium are reduced to 0.1%. In addition the incorporation of palladium tends to inhibit crystallization. While palladium may be combined with either gold or silver an especially suitable ternary alloy or amalgam is secured by the use of the following percentages:

7.20% silver
0.10% palladium
92.7% mercury

In preparation, separate amalgams of silver and mercury, and palladium and mercury are prepared. These two amalgams are then combined to form the contact material.

*Complementary contact materials*

The movable contact shown in Fig. 1 may be termed the complementary contact. As is the case with the amalgam contact, it has been observed that care must be exercised in its choice. Certain desirable precautions may be enumerated:

(1) The materials should not contain impurities which will react with mercury.

(2) The material should be capable of being mercury wetted but there should be no amalgamation, (3) The material should be a good conductor, (4) The material should not form surface oxide films when used with mercury in air, and (5) The material should preferably have a high melting point.

Materials selected according to the above classification have been found to be especially useful in that by their use with a fluid binary or ternary alloy of a non-ferrous metal with mercury no mechanical sealing means such as fluid tight glands need to be utilized at the intersections of the passageway 14 with the reservoirs 12 and 13 (Fig. 1) to prevent the leaking of the fluid amalgam 17 from the reservoirs. Such leaking, especially between the left-hand reservoir of Fig. 1 and the adjacent passageway 14 to the complementary contact material 16, would cause failure of the contact device.

It has been found that tungsten, molybdenum, platinum, rhodium and nickel appear to satisfy the above criteria.

It has been observed that a rhodium plated nickel contact is of value.

By using the above-mentioned metals in the complementary contact materials a wetted bond is established between the metal and the free mercury present in the amalgam.

Using the above materials, relays embodying the above described invention have been made and have operated successfully up to some 340 million cycles of operation and that these relays have been operated by using very small amounts of energy, and when so operated do not exhibit bounce characteristics on either make or break of the contacts.

Figure 2:
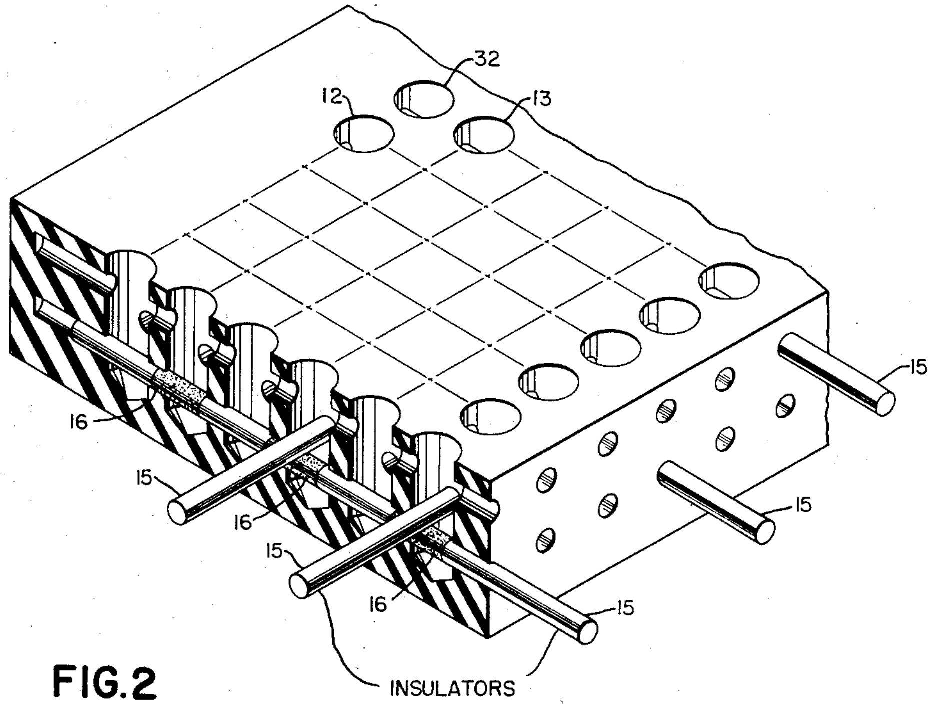
Fig. 2 shows a matrix switch constructed according to the invention.

The amalgam contact offers many possibilities in units other than relays. By combining pluralities of threes of amalgam filled holes 12, 13 and 32, as illustrated in Fig. 2, and wiring them, as shown in Fig. 3, a matrix switch of any size may be constructed.

Figures 3, 4:
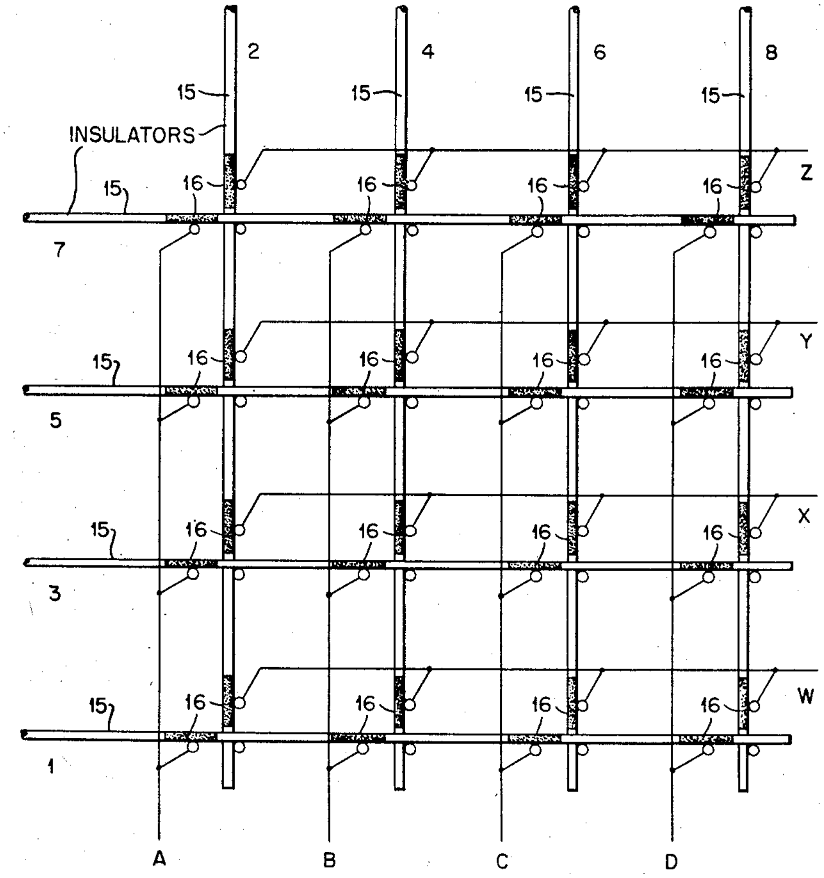
Fig. 3 illustrates an electrical circuit for the matrix switch of Fig. 2.
Fig. 4 is a chart showing circuit connection combinations for the circuit of Fig. 3.

Fig. 3 illustrates a switch of 16 combinations.

Figure 5:
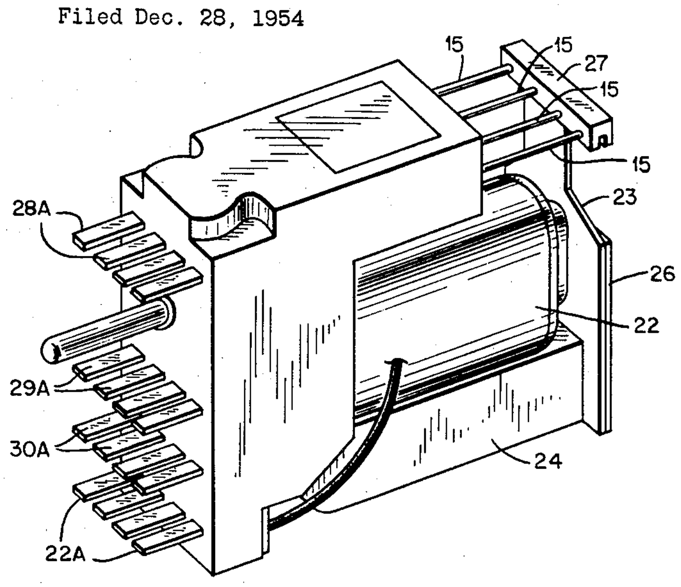
Fig. 5 illustrates the exterior form of a relay constructed according to the principles herein outlined.
Figure 6:
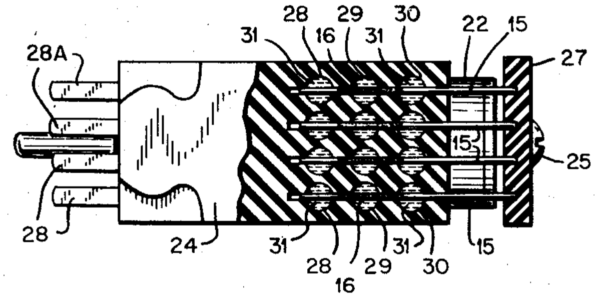
Fig. 6 is a top view of the relay in partial section.
Figure 7:
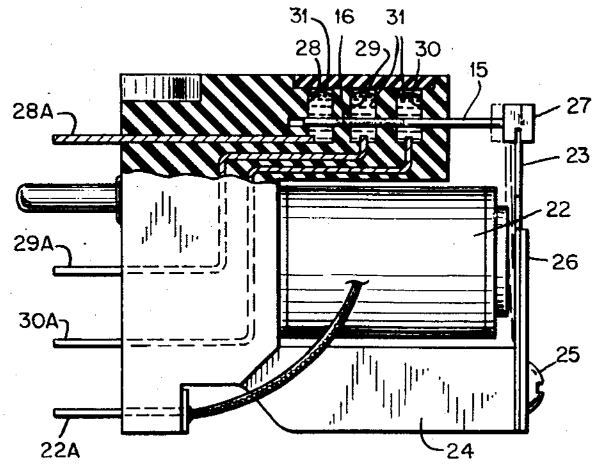
Fig. 7 is a side view of the relay in partial section.

Figs. 6 and 7 show two different sections of the relay illustrated in Fig. 5.

The novel relay has provision for switching four sets of transfer contacts and comprises an operating coil 22 for operating an armature 23. The armature 23 is spring 26 hingedly mounted upon the relay from 24 by screw means 25. Fixed to the top edge of armature 23 is slotted bar 27 adapted to support at one end thereof each of four operating members 15. As explained, in connection with Fig. 1, these operating members are slidably mounted in portholes drilled in a block, which in the instant case is a part of the relay frame 24. Also cut into the relay frame are twelve round basins 28, 29 and 30 adapted to contain amalgam 31.

In operation, relay coil 22 is energized by a source, not shown, through terminals 22A to effect a movement of the armature 23 toward the left thereby moving operating members 15 carrying thereon annular complementary contacts 16, such that each complementary contact 16 will leave basins 30 and become partially immersed in the amalgam of basins 28, to thereby switch four separate circuits 29A from terminals 30A to terminals 28A.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical contact having elements which are virtually resistanceless at their engagement surfaces, comprising a wetted bond between a fluid amalgam of mercury with a noble metal element and a conductive material element comprising metallic rhodium incapable of amalgamating with said amalgam.

2. An electrical circuit making device comprising, in combination, a base body having a pair of open ended reservoirs, an electrically conductive ternary amalgam of mercury with palladium and silver which is fluid at room temperatures partially filling each of said reservoirs and serving as one element of the electrical contact means, an aligned opening into and through said pair of reservoirs at one side of the base body, a plunger in said opening and movable therein, said plunger being of insulating material having a conductive band material located in the central part thereof comprising metallic rhodium capable of forming a non-amalgamating wetting bond with said fluid amalgam and where movement of the plunger is such as to effect engagement of the conductive band material with the conductive fluids in both reservoirs for establishing an electrical connection between said reservoirs.

3. A relay provided with circuit making devices of the type claimed in claim 2.

4. A rectangular coordinate cross-bar matrix switch comprising more than three separate circuit switching contact groups wherein the individual contact groups are constructed according to claim 2.

References Cited in the file of this patent

UNITED STATES PATENTS

| | | |
|---|---|---|
| 550,360 | Wurts | Nov. 26, 1895 |
| 1,101,009 | Burke | June 23, 1914 |
| 1,930,093 | Hatay | Oct. 10, 1933 |
| 1,948,687 | Swinne | Feb. 27, 1934 |
| 2,496,555 | Matthias et al. | Feb. 7, 1950 |
| 2,606,256 | Sissenwine et al. | Aug. 5, 1952 |
| 2,609,464 | Brown et al. | Sept. 2, 1952 |